Feb. 12, 1946.    R. COX, JR    2,394,846
ROTARY WING AIRCRAFT
Filed Dec. 15, 1943    2 Sheets-Sheet 1
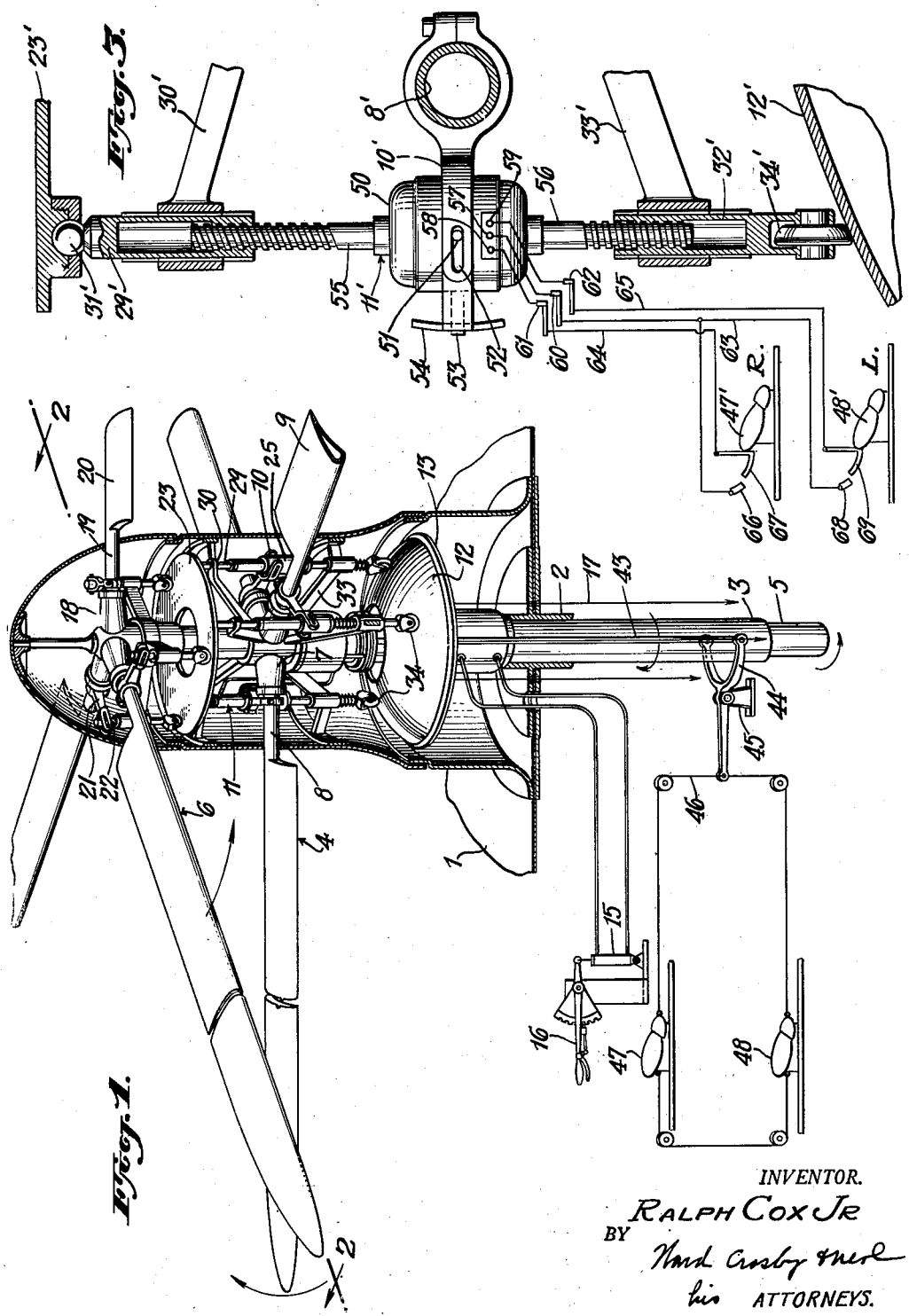
INVENTOR.
RALPH COX JR
BY
his ATTORNEYS.

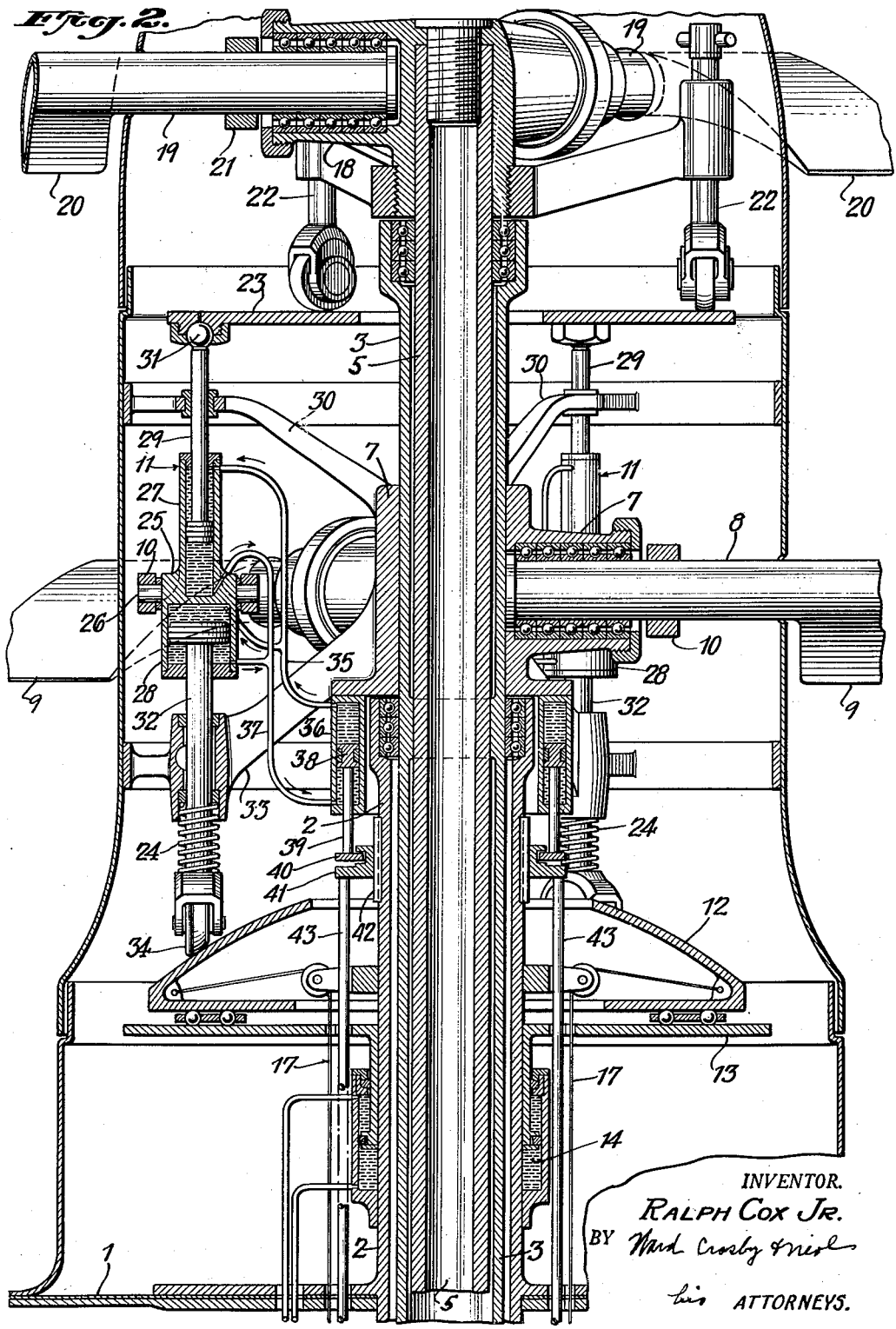

Patented Feb. 12, 1946

2,394,846

UNITED STATES PATENT OFFICE 2,394,846

ROTARY WING AIRCRAFT

Ralph Cox, Jr., Pittsburgh, Pa.

Application December 15, 1943, Serial No. 514,339

6 Claims. (Cl. 244—17)

This invention relates to rotary wing aircraft, such for example as helicopters, and more particularly to means of flight control.

In some respects the present invention is an improvement over certain features of the invention disclosed in my copending application Serial No. 495,578, filed July 21, 1943, for "Helicopter mechanism." While in its broader aspects the present invention is not limited to the type of aircraft disclosed in said prior application, in order to illustrate certain advantages of the invention the present embodiment utilizes certain features disclosed and claimed in said prior application. As to such features as are common to both applications, only sufficient details will be described herein as are necessary to an understanding of the present invention.

In said prior application, the direction and angularity of the axis of resultant lift (lift vector) of the rotating airfoils (such as the propeller or propellers) is varied by suitable means, as by cyclically varying the angle of incidence of the airfoils (such as the pitch of the propeller blades) throughout their rotational travel. In other helicopters this shifting of the lift vector is produced in other ways; and the present invention is equally applicable. This in effect provides means for determining the angle of ascent or descent of the aircraft and the general direction of travel, but only indirectly and gradually effects directional control about a relatively vertical axis. In other words, in this respect, the results in general were comparable to the individual or combined action of the elevator and ailerons of the conventional airplane, which while indirectly and gradually producing a turning movement about a vertical axis (as by banking) nevertheless requires a rudder to provide a direct and quick-acting turning movement about a relatively vertical axis. Similarly, helicopters heretofore required a tail arrangement, such as a steering propeller, for producing a variable turning moment about a vertical axis, as well as to point the nose of the body or fuselage in the direction of travel.

An object of this invention is to provide apparatus of the character described in which the torque of rotating airfoils, such as a propeller, is utilized to effect directional control about the axis of lift, such as a relatively vertical axis.

Another object is to provide apparatus wherein such directional torque control means may be utilized in conjunction with cyclical pitch variation control.

In accordance with the present invention, the torque of the rotating airfoils, such as provide lift for the aircraft, is varied to create a variable torque reaction which effects a direct and immediate turning movement while maintaining the lifting effect of said airfoils such that the aircraft does not appreciably fall off or climb on the turn. This torque variation is effective both in degree and direction and may be accomplished at any time during the full range of operative conditions of the aircraft.

The torque is initially balanced by using two propellers rotating in opposite directions, so as to provide equal and opposite torque reactions, and is varied by producing a differential in torque reaction acting in the desired direction of rotation while simultaneously maintaining the algebraic sum of the lifts of said propellers substantially the same. Selective actuation is under control of the pilot by suitable means, such as pedals, which are movable to effect "right rudder" or "left rudder," i. e., a right or left turn.

Further objects and advantages of the invention will be in part obvious and in part specifically referred to in the description hereinafter contained which, taken in conjunction with the accompanying drawings, discloses certain preferred embodiments of the invention. Such embodiments, however, should be considered as merely illustrative of the principles of the invention in its broader aspects. In the drawings—

Fig. 1 is a perspective view, with certain parts cut away, of a helicopter having propeller means equipped with actuating and control mechanism constructed to operate in accordance with the invention; certain of the control mechanism being shown somewhat diagrammatically;

Fig. 2 is a somewhat enlarged cross-section taken along a plane passing through the axis of said propeller means and showing certain of said mechanism in further detail; and Fig. 3 is an elevational view showing a modified form of actuating mechanism, with certain parts broken away, and illustrating somewhat diagrammatically control means for the same.

Referring more particularly to Figs. 1 and 2; the body of the helicopter is designated as 1 and carries rigidly secured thereto a suitable propeller shaft housing 2 in which is suitably rotatably journaled a hollow drive shaft 3 for a lower propeller designated in its entirety as 4; and within the hollow shaft 3 is suitably rotatably journaled a propeller drive shaft 5 for an upper propeller designated in its entirety as 6. The propeller shafts 3 and 5 are in suitable driven engagement with a source of power (not shown) by which they are adapted to be rotated in relatively opposite directions; in the present embodiment, the lower propeller 4 rotating in a clockwise direction and the upper propeller 6 rotating in an anticlockwise direction. The propeller 4 comprises a hub portion 7 in which are suitably journaled root axles such as 8 of the propeller blades such as 9. Each of the root axles 8 carries rigidly secured thereto an arm such as 10 by which the pitch of the blade 9 may be adjusted. Each of the arms 10 is engaged by a cam follower such as designated in its entirety as 11, slidably journaled in suitable arms rigidly carried by the hub 7 as will be more particularly referred to following. The lower ends of the followers 11 rest on a cam 12 (Fig. 2) which is supported on a suitable base 13. As more fully explained in said prior application, the base 13 is movable vertically by a hydraulic lift such as a motor 14 actuated by a hydraulic pump 15 (Fig. 1) operated by a suitable control means such as 16; to thereby vary the mean pitch of the propeller blades 9. Also, as more fully explained in said prior application, the cam 12 is movable on the base 13 laterally and angularly by suitable control means herein designated as 17; whereby the cyclical operation of the pitch of said blades may be effected.

Likewise the upper propeller 6 comprises a hub 18 in which are journaled the root axles 19 of the blades 20, and the axles 19 carry adjusting arms 21 which are engaged by push rods 22 to vary the pitch of the blades. The push rods 22 engage a plate 23 which is mounted on the upper ends of the cam followers 11 so as to partake of the up and down cyclical movement resulting from the eccentricity of the cam 12; and to also respond to the vertical movement of the cam 12 under the action of said hydraulic means. Accordingly, as is more fully disclosed in said prior application, the upper and lower blades are adjustable to a desired mean pitch and may be set for such cyclical pitch variation as may be desired to effect the angular and directional resultant thrust or lift of said blades. It is noted at this point that the blade axles, such as 8 and 19, are so disposed with respect to the center of pressure of the airfoil section of said blades that the center of pressure always imposes sufficient thrust on the push rods 22 and cam followers 11 so as to hold the followers against the surface of cam 12; but it is preferable to utilize resilient means, such as the helical springs 24 (Fig. 2), for urging the cam followers 11 against the surface of cam 12.

Referring more particularly to Fig. 2, means will now be described for varying the torque and lift of the respective lower and upper blades 9 and 20 at any mean pitch and cyclical setting of said blades. Each of the cam followers 11 comprises a hydraulic cylinder body 25 which carries trunnion pins 26 disposed within slots formed in the bifurcated end of the arm 10. The cylinder body 25 comprises an upper cylinder 27 and a lower cylinder 28 which terminate in inner ends provided by a common cylinder head. In the present embodiment where the two propellers are arranged to give substantially equal lift at a given mean pitch setting, the cylinder 27 is one-half the cross-sectional area and twice the length of the cylinder 28, for reasons to be described following. The cylinder 27 is provided with a cooperating piston carried on the lower end of a piston rod 29 which passes through a suitable bearing carried in an arm, such as 30, rigidly secured to the hub 7, and the upper end of the rod 29 is secured to the plate 23 by a ball and socket connection 31, the ball end of the rod being preferably screw-threaded into the rod to provide for axial adjustment. The lower cylinder 28 is provided with a cooperating piston carried on the upper end of a piston rod 32 which is journaled in a suitable bearing carried by the arm 33 rigidly supported from the hub 7, and the lower end of the piston rod 32 carries a suitable cam roller 34, the spring 24 being actually restrained between the lower end of the rod 32 and the arm 33. It will therefore be seen that with fluid trapped in the cylinders 27 and 28, the length of the cam follower 11 remains constant and any mean pitch adjustment or cyclical pitch variation is controlled in accordance with the positioning of cam 12. The mechanism will now be described for differentially adjusting the pitches of the blades of the respective upper and lower propellers.

The outer end of cylinder 27 and the inner end of cylinder 28 are connected by a suitable flexible conduit 35 with the upper end of the hydraulic pump 36 common to the several cam follower hydraulic cylinders. In the present embodiment the hydraulic pump 36 takes the form of an annulus which surrounds the housing 2 and is rigidly secured to the hub 7 for rotation therewith. The cylinder 36 has its lower end connected by a suitable flexible conduit 37 to the inner end of cylinder 27 and the outer end of cylinder 28. The cylinder 36 is provided with a piston 38 disposed intermediate the upper and lower cylinder ends and provided with a plurality of circumferentiallly disposed piston rods 39 rigidly connected at their lower ends to an actuating ring 40 which is freely rotatably disposed within a grooved cooperating ring 41 which is fixed against rotation and freely vertically movable by means of a spline connection 42 with the housing 2. The ring 41 is attached to the upper ends of push rods 43 which pass downwardly (Fig. 1) and are attached to the yoke ends of a lever 44 pivotally supported on a suitable base 45. The opposite end of the lever 44 is suitably connected, as by a cable means 46, to a right-foot pedal 47 and a left-foot pedal 48 in such manner that forward movement of the pedal 47 pulls the rods 43 downwardly and forward movement of the pedal 48 pushes the rods 43 upwardly; for the purpose to be more particularly set forth following.

*Operation*

With the cam 12 set in the desired vertical position for the required mean pitch setting, or desired lift of the propellers, and with the cam disposed laterally in the desired setting; directional control of the aircraft is effected in the following manner.

For a left turn, the pilot pushes the pedal 48 forwardly, which pushes the rods 43 upwardly, and this in turn moves the ring 41 (Fig. 2) upwardly along the splines 42 carrying with it the ring 40 and piston rods 39, which moves the piston 38 upwardly forcing fluid from the upper end of cylinder 36 into the outer ends of cylinders 27 and inner ends of cylinders 28 (as indicated by the arrows). Since the relative fixed point of reaction is the cam 12, the fluid passing into the inner ends of cylinders 28 moves the cylinder bodies 25 upwardly, which as will be seen from Fig. 1 increases the pitch of the lower blades 9. Simultaneously, however, the fluid entering the outer ends of cylinders 27 moves the piston rods 29 downwardly relative to the cylinder body 25 twice the distance of movement of the cylinder body, and relative to the piston rod 32 and cam 12 the same distance as the movement of the cylinder body 25 relative to the cam 12 but in the opposite direction; and accordingly the plate 23 is lowered so as to move the push rods 22 downwardly a resultant distance equal to the upward movement of the cylinder body 25. This results in a decrease in the pitch of the upper blades 20 in amount equal to that of the increase in pitch of the lower blades 9. The increase in pitch of the lower blades increases the drift or resistance to rotative movement of the lower propeller which is rotating in a clockwise direction and hence the torque reaction which is exerted in an anti-clockwise direction is increased, which causes the aircraft to turn about a vertical axis in an anti-clockwise direction, i. e., to execute a left turn. However, the increased pitch of the lower propeller also increases its lift and it is for this reason that the lift of the upper propeller is decreased to an extent to counteract or neutralize the increase in lift of the lower propeller; since otherwise the aircraft would tend to climb on a left turn. The decrease in lift of the upper propeller also decreases the torque reaction in a clockwise direction and therefore supplements the turning movement to the left.

The result of the simultaneous adjustment of the pitch of the upper and lower blades in relatively opposite directions will be illustrated by an example. Assuming the initial mean pitch of the upper and lower blades to be three degrees, and assuming that the movement of the left rudder pedal 48 is such as to increase the mean pitch of the lower blade two degrees; this gives the lower blades the mean pitch of five degrees, but simultaneously therewith the mean pitch of the upper blade is decreased two degrees so that the mean pitch of the upper blades is then one degree. Within the normal range of pitch variation of the blades, the corresponding degrees of angular pitch increase and decrease as between the upper and lower blades respectively will give a substantially corresponding equal increase and decrease in lift so that the resultant total lift of the upper and lower propellers will remain substantially the same for all practical purposes; and such minor deviations as may occur will not materially affect the operation. It is, however, within the contemplation of the invention that, if desirable, the differential variation in lift between the upper and lower propellers may be in a relative ratio other than 1:1, as will be well understood by those skilled in the art.

It will be understood that with a normal unequal distribution of lift as between one propeller and the other propeller or propellers which are to be adjusted for directional control, the differential variation will be varied accordingly. For example, if the lower propeller lift was, say, one-third of the lift of the upper propeller and the overall torque reactions of the aircraft normally balanced; then in order to prevent an unbalance in overall lift (with resultant climb or falling-off on the turns), the upper propeller pitch would be varied one-third as much as the variation in pitch of the lower propeller, i. e., the relative ratio of variation would be inversely proportionate to the respective lifts.

Upon the return of the pedal 48 to neutral position, the piston 38 is returned to neutral position and the upper and lower propeller blades are returned to their original setting.

For a right turn, the pedal 47 is pushed forward, and through the mechanism previously described fluid is moved from the lower end of the pump cylinder 36 into the outer end of cylinder 28 and into the inner end of cylinder 27 (the fluid flow being in a direction opposite to the arrows) to thereby decrease the pitch of the blades of the lower propeller and increase the pitch of the blades of the upper propeller in twice the amount; so that in an example comparable to that given above, the opposite results would follow, i. e., the mean pitch of the upper blades would be changed from three degrees to five degrees and the mean pitch of the lower blades from three degrees to one degree, with the resultant unbalance in torque reaction acting in a clockwise direction causing the aircraft to turn to the right.

From the foregoing it will be seen that the unbalance in torque in the desired direction while preventing a material change in the overall thrust or lift is utilized to effect directional control. It will be obvious to those skilled in the art, after understanding the invention, that suitable other control and actuating means may be employed for effecting differential pitch variation of the respective blades while maintaining the overall lift. For example, by making the cylinders 27 and 28 (Fig. 2) of equal diameter, fluid supplied from the pump 36 would serve to vary the pitch of the lower blades while maintaining the pitch of the upper blades unchanged; and in order to overcome the resultant change in overall lift the hydraulic actuating means 14 could be readily utilized by connecting in its feed lines in parallel circuit with the pump 15 (Fig. 1) a similar pump (independently operable from the pump 15) interconnected for two-way actuation of the pedal cable 46 so that the forward motion of the left pedal 48 will supply fluid pressure to the upper end of the hydraulic means 14 causing the cam 12 to move downwardly, while forward movement of the right pedal 47 will correspondingly move the cam 12 upwardly to decrease the mean pitch of both sets of blades. In this way the lift could be maintained constant.

*Modification (Electrical actuating mechanism)*

Instead of the hydraulic mechanism previously described for effecting differential setting of the upper and lower blades; electrical means may be conveniently employed. For example, in Fig. 3 I have shown cam follower units designated in general as 11' operatively connected to the adjusting arms 10' which are attached to the root axles such as 8' of the lower propeller blades. Each of the cam follower members 11' comprises an electrical motor 50 of the reversible type which is provided with oppositely disposed trunnion pins such as 51 which are engaged in co-operating slots such as 52 provided in spaced apart cradle arms of the arm 10'. The motor is also provided with a torque pin 53 disposed in a vertically extending slot provided in an arcuate end 54 rigidly secured to the outer end of the arm 10' so as to permit pivotal movement of the arm 10' about the axis of the axle 8' while preventing the stator of the motor 50 from rotation about its axis. The rotor of the motor 50 is provided with oppositely extending shafts 55 and 56 whose outer ends are provided with screw threads in threaded engagement with push rods 29' and 32' slidably mounted respectively in arms 30'—33'. The upper end of the push rod 29' is attached as by the ball and socket connection 31' with a plate 23'; and the lower push rod 32' is provided with a cam roller 34' which rests upon the cyclical adjusting cam 12. The pitch of the threads on the shaft end 55 is twice as great as the pitch of the threads on the shaft end 56 (in the example heretofore given); so that upon rotation of the motor in either direction, the angular movement of the push rods 29' is such as to vary the pitch of the upper blades in an equal and opposite direction relative to the variation in pitch of the lower blades resulting from the movement of the motor 50 in an axial direction due to the rotation of the shaft end 56. The operation of the motor is controlled by suitable electrical means somewhat diagrammatically illustrated as follows: Three power lines 57, 58 and 59 are electrically connected to corresponding slip rings 60, 61 and 62 concentrically mounted on the hub of the lower propeller for rotation therewith and in running engagement with corresponding lines 63, 64 and 65. The lines 63 and 64 are connected respectively to contacts 66—67, the latter being connected with the right pedal 47' for movement thereby into engagement with the fixed contact 66. Similarly, the lines 63—65 are correspondingly provided with cooperating contacts 68—69 which may be opened and closed by the left rudder 48'. The contacts 66—67 and 68—69 are connected to a suitable source of electrical energy (not shown). Movement of the left rudder 48' closes the contacts 68—69 to energize the lines 63—65 which causes the motor to rotate in an anti-clockwise direction (as viewed from the top), and rotation of the threaded shaft 56 causes the motor to move upwardly in an axial direction to increase the pitch of the attached blade; and simultaneously the rotation of shaft 55 causes the push rods 29' to move downwardly relative to the cam 12' an amount equal to the distance of upward movement of the motor 50 relative to the cam 12'. Thereby the resultant variation in pitch of the lower and upper blades is equal and opposite as above described in connection with the hydraulic control, and the airplane is thereby caused to turn to the left.

Conversely, by pushing the right pedal 47' forward, the motor is caused to rotate in the opposite direction to thereby effect a right turn.

The arcuate extensions of the movable contacts such as 67, or other suitable means, are provided for maintaining operation of the motor during the desired interval of travel of the pedals; and it is within the contemplation of the invention that electrical contacts may be arranged so as to provide for progressive increase in speed of the motor in either direction of operation depending upon the extent of motion of the pedals 47'—48', as will be understood by those skilled in the art.

Having thus described my invention with particularity with reference to presently preferred forms of the same, it will be obvious to those skilled in the art after understanding the invention, that various other changes and modifications may be made therein without departing from the scope of the invention, and it is my intention to cover in the appended claims, such changes as come within the scope of the invention.

What I claim is:

1. In a helicopter, the combination of upper and lower propellers constructed to rotate coaxially in relatively opposite directions, said propellers each having a plurality of variable pitch blades, actuating means for varying the pitch of said blades comprising a plurality of power units equal in number to the blades of one of said propellers and mounted for rotation with said last mentioned propeller, said power units having driving connections to the blades of the respective propellers constructed to vary the pitch of the blades of the respective propellers in relatively opposite directions in a differential ratio such as to maintain the total lift of both propellers substantially constant, and common directional control means for operating said actuating means, whereby the torque reaction of said propellers may be varied in a direction to effect the turning movement in either direction about a relatively vertical axis while preventing a corresponding change in the overall lift of said propellers.

2. In a helicopter, the combination of upper and lower propellers constructed to rotate coaxially in relatively opposite directions, said propellers having variable pitch blades, actuating means for varying the pitch of said blades comprising a plurality of power units bodily movable about the axis of said propellers and individually connected to respective blades of said lower propeller for movement with said blades when the pitch of said blades is varied, said power units being provided with downwardly extending cam follower elements and with upwardly extending elements in operative driving connection with said upper propeller blades for varying the pitch thereof, a cam annulus engaged by said follower elements for reciprocating said power units to thereby vary the pitch of said upper and lower propeller blades simultaneously and in the same direction, said power units comprising means for differentially moving said downwardly and upwardly extending elements to thereby vary the pitch of the blades of the respective propellers in relatively opposite directions and in such ratio as to maintain the total lift of both propellers substantially constant, and directional control means for operating said actuating means whereby the torque reaction of said propellers may be varied in a direction to effect the turning movement in either direction about the axis of said propellers while preventing a corresponding variation in the overall lift of said propellers.

3. In a helicopter, the combination of upper and lower propellers constructed to rotate coaxially in relatively opposite directions, said propellers having variable pitch blades, hydraulic actuating means for varying the pitch of said blades, said last-mentioned means comprising a plurality of hydraulic motor units bodily movable about the axis of said propellers and individually connected to respective blades of said lower propeller for movement with said blades when the pitch of said blades is varied, said hydraulic motor units being provided with downwardly extending cam follower elements and upwardly extending elements in operative driving connection with said upper propeller blades for varying the pitch thereof, a cam annulus engaged by said follower elements for reciprocating said hydraulic motor units to thereby vary the pitch of said upper and lower propeller blades simultaneously, said hydraulic motor units comprising means for differentially moving said downwardly and upwardly extending elements to thereby move blades of the respective propellers in relatively opposite directions and in such ratio as to maintain the total lift of both propellers substantially constant, and directional control means for operating said actuating means, whereby the torque reaction of said propellers may be varied in a direction to effect the turning movement in either direction about a relatively vertical axis while substantially maintaining the overall lift of said propellers.

4. In a helicopter, the combination of upper and lower propellers constructed to rotate coaxially in relatively opposite directions, said propellers having variable pitch blades, hydraulic motor means for varying the pitch of said blades, said last-mentioned means having driving connections to the blades of the respective propellers, said driving connections to the blades of the respective propellers being movable in relatively opposite directions and in such ratio as to maintain the total lift of both propellers substantially constant, hydraulic pump means for operating said actuating means, and directional control means for operating said pump, whereby the torque reaction of said propellers may be varied in a direction to effect the turning movement in either direction about a relatively vertical axis while preventing a substantial change in the overall lift of said propellers.

5. In a helicopter, the combination of upper and lower propellers constructed to rotate coaxially in relatively opposite directions, said propellers each having a plurality of variable pitch blades, electromotive actuating means for varying the pitch of said blades comprising a plurality of electrical motors associated respectively with the individual blades of said one of said propellers and mounted for revolution about the axis of said propellers, said electrical motors having differential driving connections to the blades of the respective propellers constructed to vary the pitch of the blades of the respective propellers in relatively opposite directions and in such ratio as to maintain the total lift of both propellers substantially constant, and directional control means for operating said actuating means, whereby the torque reaction of said propellers may be varied in a direction to effect the turning movement in either direction about a relatively vertical axis while preventing a corresponding variation in the overall lift of said propellers.

6. In a helicopter, the combination of upper and lower propellers constructed to rotate coaxially in relatively opposite directions, said propellers each having a plurality of variable pitch blades, electromotive actuating means for varying the pitch of said blades comprising a plurality of reversible electrical motors associated respectively with the individual blades of said one of said propellers and mounted for revolution about the axis of said propellers, said electrical motors having differential screw-thread driving connections to the blades of the respective propellers constructed to vary the pitch of the blades of the respective propellers in relatively opposite directions and in such ratio as to maintain the total lift of both propellers substantially constant, and directional control means for simultaneously operating said electrical motors in either direction of rotation, whereby the torque reaction of said propellers may be varied in a direction to effect the turning movement in either direction about a relatively vertical axis while preventing a corresponding variation in the overall lift of said propellers.

RALPH COX, Jr.